(12) United States Patent
Denker et al.

(10) Patent No.: US 7,677,072 B2
(45) Date of Patent: Mar. 16, 2010

(54) METHOD OF AND APPARATUS FOR STRIP BLOW-OFF

(75) Inventors: Wolfgang Denker, Freudenberg (DE); Armin Klapdor, Kirchhundem (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 7 days.

(21) Appl. No.: 11/666,049

(22) PCT Filed: Dec. 13, 2005

(86) PCT No.: PCT/EP2005/013331

§ 371 (c)(1),
(2), (4) Date: Apr. 20, 2007

(87) PCT Pub. No.: WO2006/063779

PCT Pub. Date: Jun. 22, 2006

(65) Prior Publication Data

US 2007/0295048 A1 Dec. 27, 2007

(30) Foreign Application Priority Data

Dec. 14, 2004 (DE) .......... 10 2004 060 086

(51) Int. Cl.
*B21B 27/06* (2006.01)

(52) U.S. Cl. .................. 72/236; 72/38; 72/39

(58) Field of Classification Search .......... 72/38, 72/39, 201, 236, 342.2; 137/15.04, 15.05; 15/300.1, 306.1, 309.1, 317, 345

See application file for complete search history.

(56) References Cited

U.S. PATENT DOCUMENTS

| | | | | |
|---|---|---|---|---|
| 3,328,997 A | * | 7/1967 | Beggs et al. .......... | 72/342.5 |
| 4,344,308 A | * | 8/1982 | Shimada et al. .......... | 72/39 |
| 4,454,621 A | * | 6/1984 | Testone .......... | 15/1.51 |
| 4,467,629 A | * | 8/1984 | Schimion .......... | 72/11.7 |
| 4,477,287 A | | 10/1984 | Kush et al. | |
| 4,691,549 A | * | 9/1987 | Adair .......... | 72/38 |
| 4,751,759 A | * | 6/1988 | Zoell .......... | 15/1.51 |
| 5,313,685 A | | 5/1994 | Kramer et al. | |
| 5,603,775 A | * | 2/1997 | Sjoberg .......... | 134/21 |
| 5,775,152 A | | 7/1998 | Daub et al. | |
| 5,849,098 A | * | 12/1998 | Volkmann .......... | 134/15 |
| 6,474,355 B1 | * | 11/2002 | Jirawat et al. .......... | 15/306.1 |
| 6,834,521 B1 | | 12/2004 | Denker et al. | |
| 6,916,404 B2 | * | 7/2005 | Komulainen et al. .......... | 162/193 |

(Continued)

FOREIGN PATENT DOCUMENTS

DE 9506899 8/1996

OTHER PUBLICATIONS

Patent Abstract of Japan, publication No. 07132270, May 23, 1995.

*Primary Examiner*—Edward Tolan
(74) *Attorney, Agent, or Firm*—Abelman, Frayne & Schwab

(57) ABSTRACT

The invention relates to a method of strip blow-off at an exit of rolling mills for producing a spotless and clean rolled strip, according to which the strip (5) is blown off with at least one nozzle (16) arranged above the upper side (14) of the strip, and a rolling oil/emulsion stuck on the strip (5) is aspirated from their edges (18', 18") by a suction device (20), and wherein on the upper side (14) and a lower side (15) of the strip (5), a chamber (21, 22) in which overpressure prevails, is formed and to a corresponding device.

12 Claims, 4 Drawing Sheets

Figure 1:
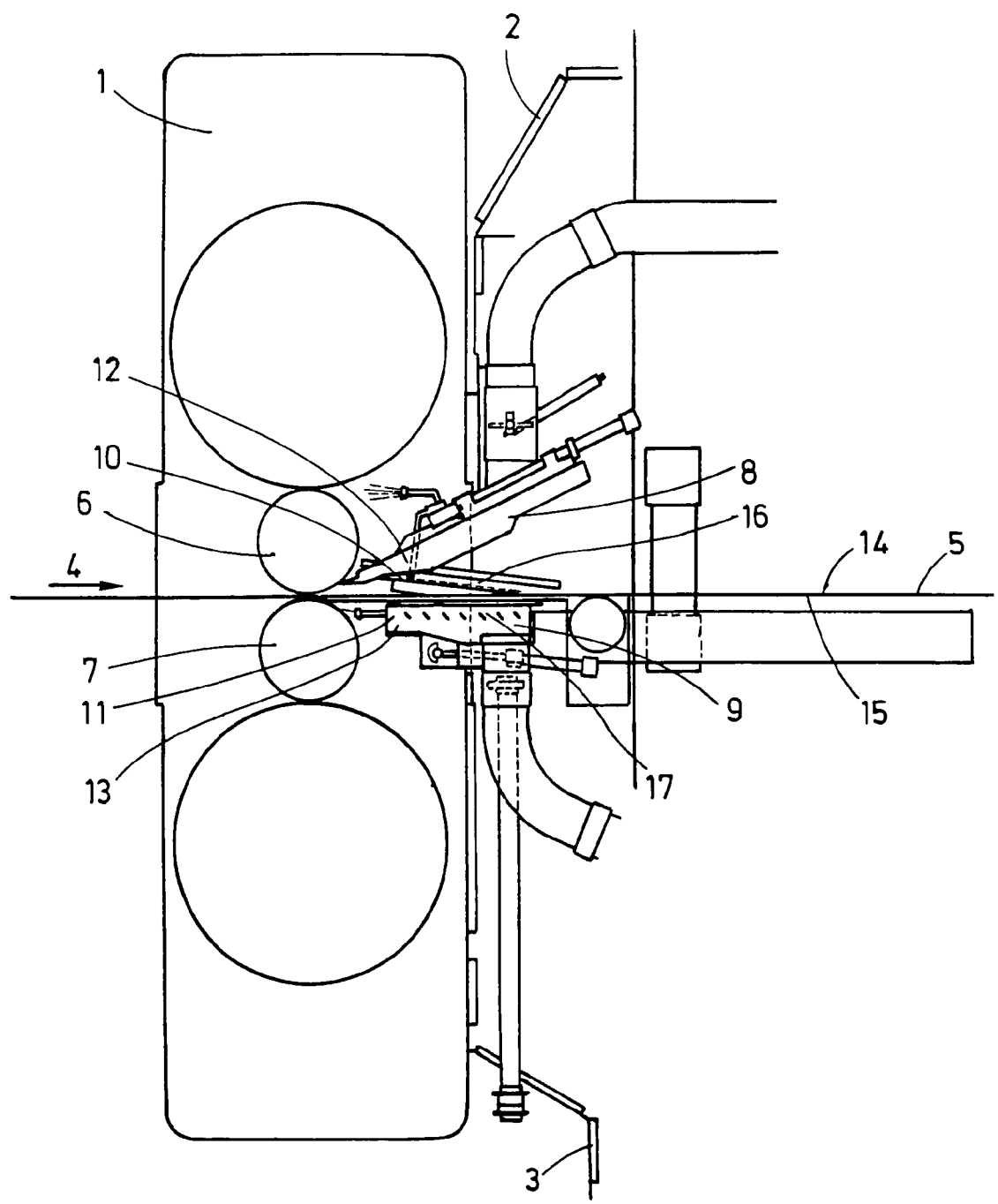

U.S. PATENT DOCUMENTS 6,928,753 B2 * 8/2005 Richter et al. .................. 34/620
7,435,374 B2 * 10/2008 Kimura et al. .............. 266/135
7,520,946 B2 * 4/2009 Pavlicevic et al. ........... 148/657

* cited by examiner

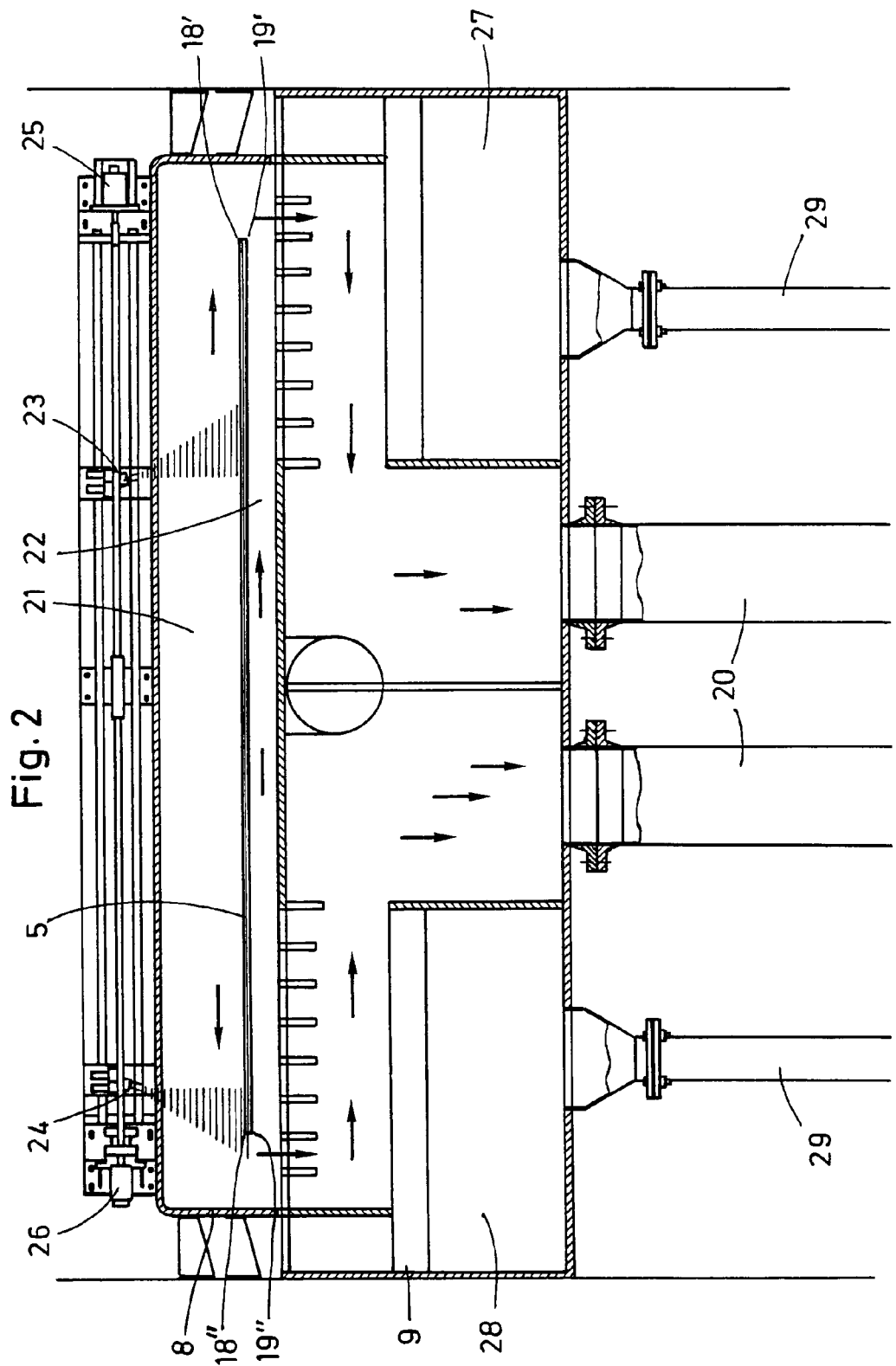

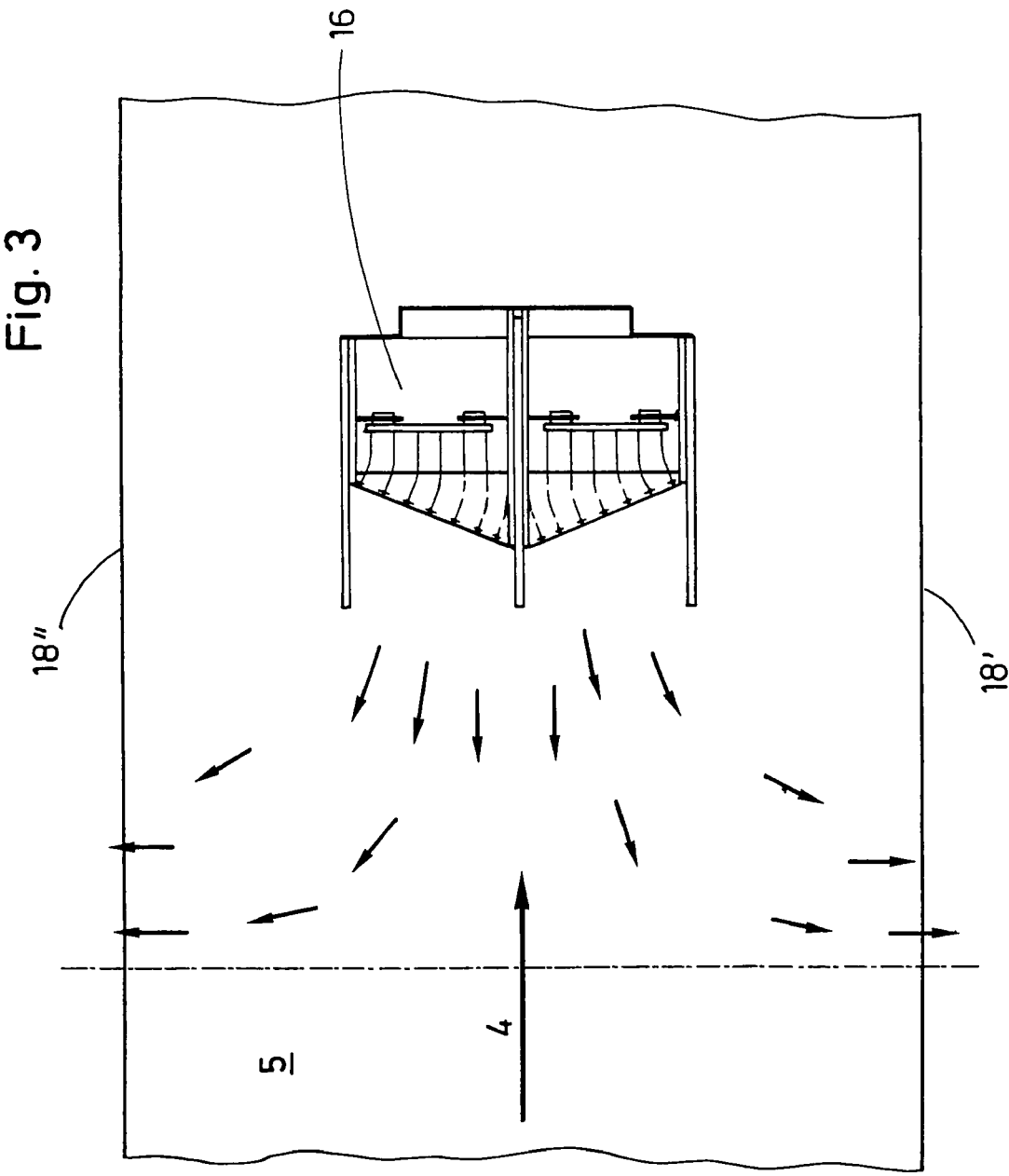

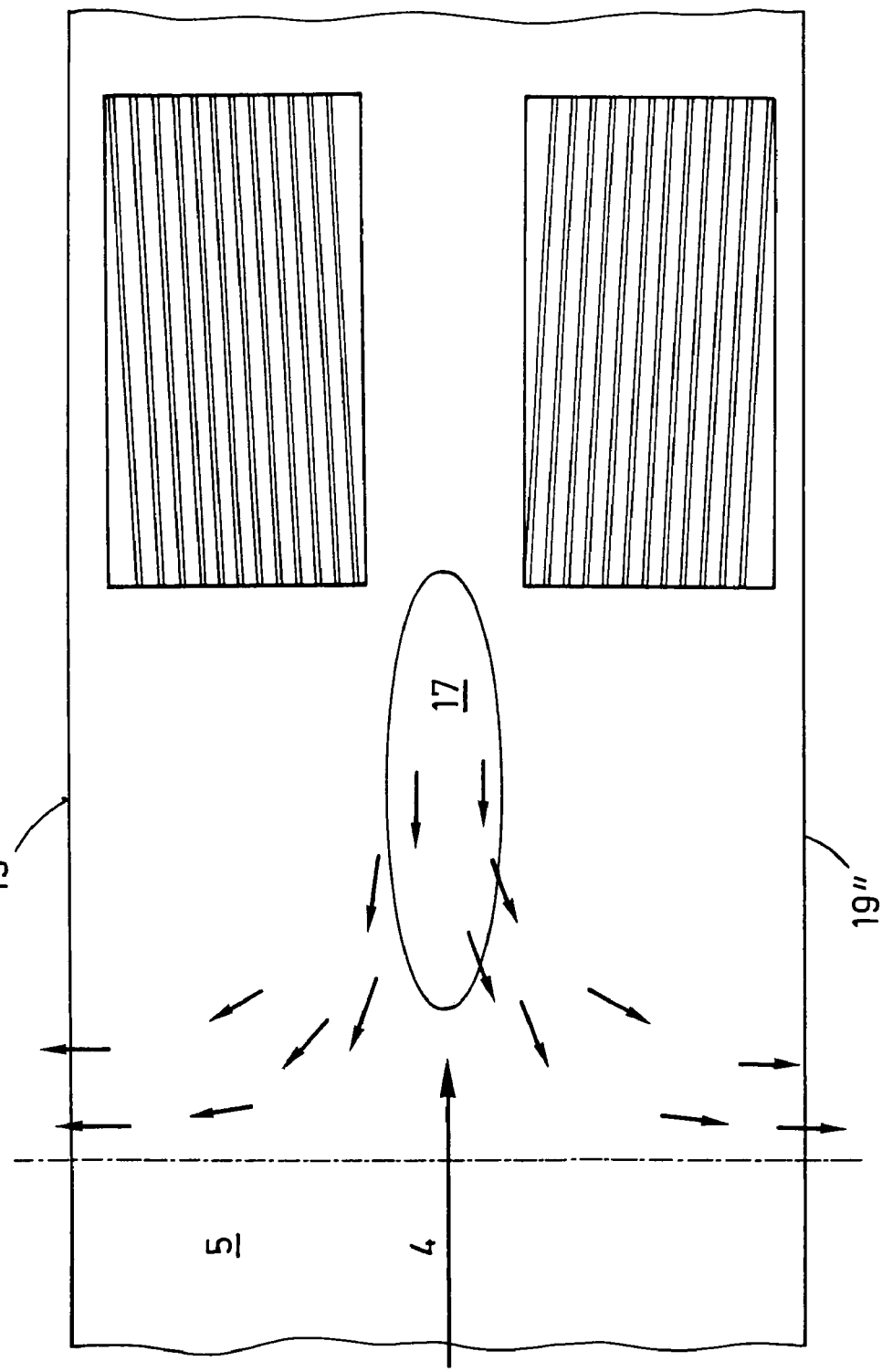

METHOD OF AND APPARATUS FOR STRIP BLOW-OFF

The invention relates to a method of a strip blow-off at a rolling mill exit for producing a spotless and clean rolled strip and according to which the strip is blown off with at least one nozzle arranged above the strip upper surface, and the rolling oil/emulsion which is stuck to the strip, is aspirated by a suction device, and to a corresponding apparatus.

In cold rolling mills especially, in particular during rolling of aluminum with an emulsion/rolling oil or during cold rolling with a simultaneous cooling of exit side rolls, the requirements to the strip dryness are very high. The cleanliness of the strip surface is as important as the thickness tolerance and the flatness.

In aluminum rolling mills, actually, rolling is carried out with easily ignitable rolling oils because up to now, no functionally reliable strip drying system is available.

State of the art consists in flowing of a strip with the aid of an air nozzle. To this end, compressed air is used. However, an induced air, which is produced by a ventilator, is also used.

EP 0 765 696 B1 discloses an apparatus for keeping a cold rolled strip free of moisture in which different means for deflecting and removing liquid rolling media are combined into one functional unit. With a stationary mounted partition one portion of which extends above the strip exit up to the stand platform, and another portion of which extends below the strip exit up to the base plate, the moist-wet roll region is separated from the already rolled strip. An additional movable partition, which is formed of movable components, takes care of further separation of the moist-wet roll region from the already rolled strip, however, as a result of mobility of its components, it provides for an advantageous access to the rolls, e.g., during carrying out a roll exchange. Simultaneously, the movable components function as a strip deflector and/or means for strip transfer. The movable components, which are formed as stops, can alternatively be mechanically stationary or adjustable dependent on abrasion of roll barrels.

Further mounted components from EP 0 765 696 B1 include:
- a roll barrel blower for transferring the squeezed-out rolling medium from the already rolled strip,
- a roll barrel gap sealing means that seals the moist-wet roll space above the rolled strip from the already rolled strip,
- a strip edge blower with which the entrained rolling oil is deflected laterally of the strip edge from the rolled strip, and
- a dust suction means for generating parallel air currents above and beneath the rolled strip in direction opposite the strip running direction.

Similar apparatuses for keeping dry, in particular, a cold strip at the exit of rolling plants are disclosed in U.S. Pat. No. 6,134,811A, DE'195 19 544A, DE 43 05 907A, and JP 07 178 438A.

In further development of EP 0 765 696 B1, according to WO 03/068 426 A1, an apparatus for keeping a cold-rolled strip dry in the exit of rolling plants with means for deflecting liquid rolling media in the region of the strip exit and/or for keeping the liquid sprayable onto the strip upper surface away, is formed of the following, combined in a functional unit, components, namely, stationary partitions and movable partitions arranged above and beneath the rolled strip, roll barrel blower, roll barrel gap sealing means, and dust suction means, and further includes an arranged above the roll strip, upper strip deflector with an integrated, ventilator-driven blow-off means with a low-pressure nozzle, an upper roll barrel gap sealing means in form of a slotted nozzle, and an arranged beneath the rolled band, separate suction device with an integrated lower strip deflector.

The strip leaves the rolling plant/rolling stand with a speed that creates vacuum in the vicinity of the strip. It has been recognized that this vacuum acts against the requirement for a dry and impurities-free strip because the strip blow-off is directed opposite the rolling direction (Bernoulli effect) and the effect of the strip blow-off is reduced.

Accordingly, an object of the invention is to provide a method and an apparatus of the type described above and which would increase the effect of the blow-off and would provide a liquid-free and impurities-free strip.

This object is achieved according to the invention in that with a method according to the preamble of claim 1, a chamber is formed on the upper side and the lower side of the strip in which overpressure is available.

Advantageous embodiments of the method are recited in sub-claims.

In the inventive apparatus according to claim 7, an upper cover with at least one overpressure nozzle is arranged above the strip, a lower cover with at least one overpressure nozzle is arranged beneath the strip, and viewing in the rolling direction, a contactless seal is arranged, respectively, at a beginning of the upper and lower covers.

Advantageous embodiments of the apparatus are recited in the sub-claims.

The decisive advantage of the inventive method and the inventive apparatus consists in that overpressure is available above and below the strip that conducts the stuck rolling oil/emulsion toward the strip edge and keeps impurities, such as dust, particles, etc., which are present in the strip environment away from the strip. A contactless seal, which is provide at the ends of the upper and lower strip covers adjacent to the working rolls provides for formation of a closed space that surrounds the strip from all sides.

In addition to the use of air/compressed air, dependent on the material and the availability, another gas, liquid oxygen or $CO_2$ can be used. When $CO_2$ is used, a connection, e.g., by a selector valve, with a fire protection system is possible.

In addition to the overpressure nozzles, the strip edges are subjected to action of additional nozzles (strip edge blow-off).

An embodiment of the invention will now be described in detail based on very schematic drawings.

The drawings show:

FIG. 1 a vertical sectional view in a rolling direction of a rolling mill stand with a downstream device for blow-off a strip;

FIG. 2 a vertical sectional view of the device for blow-off a strip in a direction transverse to the rolling direction;

FIG. 3 a plan view of flow paths of an air stream over the upper strip surface from an overpressure nozzle; and;

FIG. 4 a plan view of flow paths of an air stream over the lower strip surface from an overpressure nozzle.

FIG. 1 shows a rolling mill stand 1 with stationary mounted upper partition 2 and lower partition 3. The strip 5, which is displaced in a rolling direction shown with arrow 4, after leaving the working rolls 6, 7, is located between upper strip cover 8 and lower strip cover 9. At the respective ends 10 and 11 of the upper strip cover 8 and the lower strip cover 9, which are located next to the working rolls 6 and 7, devices 12 and 13 for contactless sealing are arranged. To this end, a sealing device, such as described in DE 44 22 422 A1 is particularly suitable. The contactless sealing devices completely separate the region of working rolls 6, 7 from the region of the strip blow-off, as the sealing devices are arranged both above and beneath the strip 5. In the region of the strip 5, which is formed by the upper strip cover 8 and the lower strip cover 9, on both sides of the strip 5, the upper side 14 and the lower side 15, an overpressure air stream is provided with overpressure nozzles 16, 17. This overpressure air stream is directed in a direction opposite the rolling direction 4 and displaces the rolling oil, which still covers the strip 5, toward the upper and lower strip edges 18, 19 (FIG. 2). Therefrom, the rolling oil is aspirated in a suction device 20 which is arranged beneath the lower strip cover 9.

The overpressure air stream, which is available above and beneath the stream 5, compensates and superimposes the vacuum in the region of strip 5 produced as a result of the strip speed. The still stuck rolling oil and impurities, which are still present in the environment of the strip 5, are not displaced any more toward the strip 5 but are rather removed or kept away from the strip 5 by the overpressure air stream.

The inventive apparatus from the upper strip cover 8 and the lower strip cover 9 is shown in FIG. 1. The lower strip cover 9 is formed as a table, whereas the upper strip cover 9 is formed as a U-shaped hood. The upper strip cover 8 is connected with an overpressure nozzle (not shown) that directs an overpressure air stream over the upper surface 14 of the strip 5. The overpressure air stream is directed laterally in a direction of right upper strip edge 18' and left upper strip edge 18." In the chamber 21 above the strip 5, an overpressure is created.

A further overpressure nozzle is provided on the lower side 15 of the strip 5 and creates overpressure beneath the stream 5 in the chamber 22. The overpressure delivers the residual rolling oil toward the lower right and left strip edges 19', 19".

As further shown in FIG. 2, the strip edges 18', 18" can be blown off with separate nozzles 23, 24. The additional nozzles 23, 24 are arranged, e.g., as to be movable and can be adapted with servo motors 25, 26 to different strip widths, so that the nozzles 25, 26 are always directed toward the strip edges 18', 18". The rolling oil, which is removed from the strip 5, is accumulated in rolling oil preseparators 27, 28 which are located beneath the lower strip cover 9, and therefrom are removed through conduits 29. The overpressure air stream beneath the table or the lower cover 9 is aspirated by the suction system 20 and is filtered in a downstream device. It should be understood that the suction system 20 is so adjusted that overpressure remains in the chamber 21 and the chamber 22.

Because the vacuum in the region of the strip 5 varies during rolling and depends on the strip speed, strip width, surface characteristics, etc., there is provided regulation means that adjusts the predetermined overpressure air stream.

FIG. 3 shows flow paths of air, which exits the overpressure nozzle 16 that is connected with the upper strip cover, on the upper side 14 of the strip 5. The overpressure nozzle 16 is located in the middle above the strip 5. Baffle plates, which are located in the overpressure nozzle 16, deflect the air stream laterally in a fanlike manner. Thereby, it is achieved that the rolling oil, which still remains on the strip 5 is displaced in a direction opposite the rolling direction 4 toward the strip edges 18', 18" and is aspirated therefrom by the suction device 20 located beneath the strip 5. The overpressure air stream forms an insulating air cushion that prevents deposition of impurities on the strip 5, with the impurities being kept away from the strip 5 by the overpressure air stream.

A corresponding overpressure nozzle 17, which is directed to the lower side 15 of the strip 5, is shown in FIG. 4. Again, the overpressure nozzle 17 is arranged in the middle and is secured to the lower strip cover 9 at an angle, beneath the cover 9. The lower strip cover 9, which is formed, e.g., as a table, has an oval opening through which the overpressure air stream is conducted in a direction opposite the rolling direction. The overpressure air stream displaces the rolling oil, which is still stuck to the lower side 15 of the strip 5, toward the strip edges 19', 19", with the rolling oil being aspirated therefrom by a suction device 20$p$ located below.

According to the invention, a plurality of overpressure nozzles can be arranged above and/or beneath the strip. The number and the arrangement depend, e.g., on the strip, width or the available ventilators. Provision of a plurality of suction devices is also contemplated.

LIST OF REFERENCE NUMERALS

1 Rolling mill stand
2 Upper partition
3 Lower partition
4 Arrow rolling direction
5 Strip
6 Working roll
7 Working roll
8 Upper strip cover
9 Lower strip cover
10 End of the strip cover
11 End of the strip cover
12 Device
13 Device
14 Upper side
15 Lower side
16 Overpressure nozzle
17 Overpressure nozzle
18 Upper strip edge
19 Lower strip edge
18', 18" Right and left upper strip edge
18', 18" Right and left lower strip edge
20 Suction device
21 Chamber
22 Chamber
23 Nozzle
24 Nozzle
25 Servo motor
26 Servo motor
27 Preseparator
28 Preseparator
29 Conduit

The invention claimed is:

1. A method of strip blow-off at an exit of a rolling mill for producing a spotless and cleaned rolled strip, the method comprising the steps of providing at least one nozzle arranged above an upper side of a strip for blowing off the strip; providing upper and lower covers above and below the strip for forming, on the upper side of the strip and the lower side of the strip, respectively, a substantially closed chamber in which overpressure is created during the blow-off of the strip for compensating vacuum produced in the vicinity of the strip as a result of a high speed of the strip leaving a rolling mill stand; blowing off the strip with the at least one nozzle; and aspirating oil/emulsion stuck on the strip with a suction device.

2. A method according to claim 1, wherein the overpressure in the chamber is produced by introduction of gas with overpressure nozzles.

3. A method according to claim 1, wherein the chambers are formed by the movable upper strip cover and a movable lower strip cover.

4. A method according to claim 1, wherein at an end of the upper strip cover and at an end of the lower strip cover, a device for a contactless sealing is provided.

5. A method according to claim 1, wherein the suction device for aspirating impurities and/or rolling oil/emulsion is arranged beneath the strip.

6. An apparatus for strip blow-off in an exit of a rolling mill for producing a spotless and clean rolled strip, comprising at least one nozzle arranged above an upper side of the strip; an upper cover for the strip, the at least one nozzle being provided at the upper cover; a lower cover for the strip, the upper and lower covers forming together two substantially closed overpressure chambers located, respectively, on the upper and lower sides of the strip; at least one contactless sealing device provided, respectively, at an end of the upper strip cover and an end of the lower strip cover; and a suction device for aspirating oil/emulsion stuck on the strip.

7. An apparatus according to claim 6, wherein the lower strip cover is formed as a table the upper strip cover is formed as a U-shaped hood the legs of which contact the table.

8. An apparatus according to claim 6, wherein the overpressure nozzles are secured, respectively, on the upper strip cover and the lower strip cover at an angle.

9. An apparatus according to claim 6, wherein above upper right and left strip edges, at least one additional nozzle is arranged.

10. An apparatus according to claim 9, wherein the nozzles are connected with a servo motor.

11. An apparatus according to claim 9, wherein each nozzle is connected with a separate servo motor.

12. An apparatus according to claim 6, wherein the overpressure nozzles produce, respectively, an overpressure air stream directed in a direction opposite a rolling direction of the strip.

* * * * *